United States Patent
Mossnang

(10) Patent No.: US 9,193,057 B2
(45) Date of Patent: Nov. 24, 2015

(54) HAND MACHINE TOOL AND ABSORBER

(75) Inventor: Franz Mossnang, Stadtbergen (DE)

(73) Assignee: HILTI AKTIENGESELLSCHAFT (LI)

( * ) Notice: Subject to any disclaimer, the term of this patent is extended or adjusted under 35 U.S.C. 154(b) by 817 days.

(21) Appl. No.: 13/452,099

(22) Filed: Apr. 20, 2012

(65) Prior Publication Data

US 2012/0267136 A1 Oct. 25, 2012

(30) Foreign Application Priority Data

Apr. 20, 2011 (DE) .......................... 10 2011 007 725

(51) Int. Cl.
*B25D 17/24* (2006.01)
*B25F 5/00* (2006.01)
*F16F 7/116* (2006.01)
*F16F 3/04* (2006.01)

(52) U.S. Cl.
CPC ................ *B25F 5/006* (2013.01); *B25D 17/24* (2013.01); *F16F 7/116* (2013.01); *B25D 2211/068* (2013.01); *B25D 2217/0092* (2013.01); *B25D 2250/051* (2013.01); *B25D 2250/245* (2013.01); *F16F 3/04* (2013.01)

(58) Field of Classification Search
CPC ............. B25D 17/24; B25D 2211/068; B25D 2217/0092; F16F 7/116; B25F 5/006
USPC .............................. 173/162.2, 161.1; 188/380
See application file for complete search history.

(56) References Cited

U.S. PATENT DOCUMENTS

| | | | | |
|---|---|---|---|---|
| 5,082,067 | A * | 1/1992 | Tornqvist ........................ | 173/17 |
| 5,873,438 | A * | 2/1999 | Osterberg et al. ............. | 188/379 |
| 6,920,967 | B2 * | 7/2005 | Wood ............................. | 188/380 |
| 8,066,106 | B2 | 11/2011 | Moessnang | |
| 8,181,715 | B2 * | 5/2012 | Bito et al. ................... | 173/162.1 |
| 8,434,565 | B2 * | 5/2013 | Hecht et al. ................ | 173/162.1 |
| 2006/0289185 | A1 * | 12/2006 | Hahn ............................ | 173/210 |
| 2008/0179797 | A1 | 7/2008 | Manschitz et al. | |
| 2008/0185165 | A1 * | 8/2008 | Moessnang ................... | 173/211 |

(Continued)

FOREIGN PATENT DOCUMENTS

| | | |
|---|---|---|
| DE | 102007000057 A1 | 8/2008 |
| DE | 102007000056 A1 | 9/2008 |
| DE | 102007055792 A1 | 6/2009 |
| DE | 102009027423 A1 | 1/2011 |

(Continued)

OTHER PUBLICATIONS

DE Communication, May 22, 2012 in Application No. 10201107725.1 (2 pages).
EP Communication, Aug. 21, 2013 in Application No. 12157409.9-1709/ U.S. Pat. No. 2,514,570 (6 pages).

*Primary Examiner* — Andrew M Tecco
(74) *Attorney, Agent, or Firm* — McAndrews, Held & Malloy, Ltd.

(57) ABSTRACT

The absorber for a hand machine tool according to the invention with a linear drive has a case and a body of mass moveable alongside of an absorber axis relative to the case. Force is applied toward a first direction to a first coupling element moveable alongside of the absorber axis, which is coupled with the body of mass using a first spring. Force is applied toward a second direction to a second coupling element moveable alongside of the absorber axis using a second spring coupled with the case. With a movement toward the first direction, the first coupling element is frictionally coupled with the second coupling element and with a movement toward the second direction, it is uncoupled from the second coupling element.

13 Claims, 7 Drawing Sheets

(56) References Cited

U.S. PATENT DOCUMENTS

2009/0236113 A1* 9/2009 Gumpert et al. ............. 173/210
2011/0024144 A1* 2/2011 Usselman et al. ............. 173/1
2011/0024149 A1* 2/2011 Hecht et al. ............. 173/162.2

FOREIGN PATENT DOCUMENTS

| GB | 2169684 A | 7/1986 |
| GB | 2170573 A | 8/1986 |
| WO | 2011000609 A1 | 1/2011 |

* cited by examiner

HAND MACHINE TOOL AND ABSORBER

CROSS-REFERENCE TO RELATED APPLICATIONS

The present application claims priority to German Patent Application DE 10 2011 007 725.1, filed Apr. 20, 2011, and entitled "Handwerkseugmaschine and Tilger" ("Hand Machine Tool and Absorber"), which is hereby incorporated by reference in its entirety.

BACKGROUND OF THE INVENTION

The present invention generally relates to a hand machine tool and an absorber for the hand machine tool.

BRIEF SUMMARY OF THE INVENTION

The absorber according to one or more embodiments of the invention for a hand machine tool with a linear drive has a case and a body of mass moveable alongside of an absorber axis relative to the case. Force is applied toward a first direction to a first coupling element moveable alongside of the absorber axis, which is coupled with the body of mass. Force is applied toward a second direction to a second coupling element moveable alongside of the absorber axis using a second spring coupled with the case. The first direction is opposed to the second direction. While the body of mass may push the first coupling element toward the first direction using the first spring, the case pushes the second coupling element toward the second direction opposed to the first direction using the second spring.

With a movement toward the first direction, the first coupling element is frictionally coupled with the second coupling element and with a movement toward the second direction, it is uncoupled from the second coupling element. As a result, the first coupling element moves toward the first direction by carrying along the second coupling element and toward the second direction without carrying along the second coupling element. In the process, the first direction corresponds to the effective direction of the first spring acting on the first coupling element, i.e. the direction in which the first spring is exerting a force onto the first coupling element.

BRIEF DESCRIPTION OF THE DRAWINGS

The description below explains the invention based on exemplary embodiments and figures. In the figures.

To the extent not otherwise specified, identical elements or elements with the same function are indicated with identical reference numbers in the figures.

DETAILED DESCRIPTION OF THE INVENTION

Figure 1:
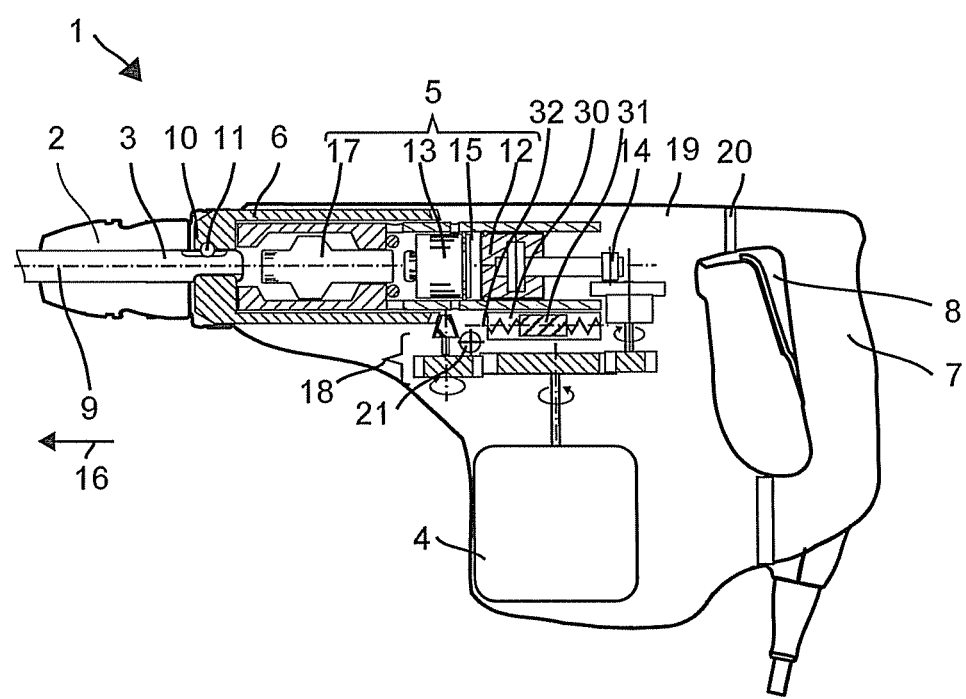
FIG. 1 shows a hammer drill.

A switching device may inhibit or release a movement of the first coupling element relative to the case, depending on the switching positions and/or the switching device may inhibit or release a movement of the second coupling element in the second direction relative to the body of mass depending on the switching positions. If the movement of both coupling elements is unrestrained, i.e. uninhibited by the switching device relative to the case, both springs are acting on the body of mass in series. If the movement of both coupling elements is inhibited by the switching device, the two springs are acting on the body of mass in parallel. If the first coupling element is inhibited and the second coupling element is unrestrained, only the first spring is effective; if the first coupling element is unrestrained and the second coupling element is inhibited, only the first spring is effective.

One arrangement provides that a first stop face of the first coupling element pointing toward the first direction is detachably resting on a second stop face of the second coupling element pointing toward the second direction. Because the stop faces are resting on each other, the first coupling device may only be moved toward the first direction by carrying along the second coupling device. Vice versa, the second coupling element may only be moved toward the second direction by carrying along the first coupling element. A movement of the first coupling element toward the second direction or a movement of the second coupling element toward the first direction is possible without carrying along, because the two coupling elements are resting on each other detachably. The two stop faces may already rest on each other when the body of mass is in an idle position or when the body of mass is slightly deflected. The stop faces may be perpendicular or tilted to the absorber axis; the stop faces are preferably parallel to each other. Alternatively, a third coupling element moveable along the absorber axis is provided, which rests on the first stop face and the second stop face and is detachable from at least the first stop face toward the second direction or from the second stop face toward the first direction. The detachable carrying along of the second coupling element by the first coupling element is achieved with the third coupling element.

One arrangement provides that in one of the switching positions, the body of mass touches the second coupling element on a third surface tilted toward the second direction and in a different switching position the body of mass has a distance from the third surface. The other switching position inhibits the relative movement of the body of mass to the second coupling element. Alternatively or additionally, it is provided that in one of the switching positions the case touches the first coupling element on a fourth surface tilted toward the first direction and in a different switching position, the case has a distance from the fourth surface.

One arrangement provides a hand machine tool, which comprises a pneumatic rammer whose beating period may be adjusted using a control element. The control element is coupled with the switching device. The control element to be operated by the user, e.g. a rotary type switch is preferably coupled with the switching device using a mechanical rod assembly FIG. 1 shows a schematic view of a hammer drill 1. The hammer drill 1 has a tool retainer 2, into which a boring tool 3 may be inserted as a tool. A motor 4, which drives a rammer 5 and optionally a drive shaft 6 serves as primary drive of the hammer drill 1. A user may guide the hammer drill 1 using a handle 7 and start operating the hammer drill 1 using a system switch 8. The handle 7 is arranged as an extension of the working axis 9, so that the boring tool 3 and the rammer 5 may ergonomically be pushed against a work piece. While in operation, the hammer drill 1 continuously turns the boring tool 3 around a working axis 9, while beating the boring tool 3 into the work piece alongside of the working axis 9. The drive shaft 6 may additionally turn the boring tool 3 around the working axis 9 during the beating process.

The tool retainer 2 has a retainer sleeve 10, into which one end of the boring tool 3 may be inserted. Locking elements 11 in the retaining sleeve 10 secure the boring tool 3 against falling out. The retaining sleeve 10 has an inside non-rotation-symmetric outline friction-fitted to the boring tool 3, which transmits a torque from the retaining sleeve 10 to the boring tool 3. Radially inward pointing pegs or spheres 11 may for instance be provided in the retaining sleeve 10.

The rammer 5 is for example a pneumatic rammer 5. A for example piston-shaped exciter 12 and a for example piston-shaped beater 13 are moveably conducted in the rammer 5 alongside of the working axis 9. Alternatively, the exciter 12 may be pot-shaped. The exciter 12 is coupled to the motor 4 by way of a cam 14 or an oscillating finger and forced to perform a periodic linear movement. A pneumatic spring formed with a pneumatic chamber 15 between the exciter 12 and beater 13 (percussion piston) couples a movement of the beater 13 to the movement of the exciter 12. In beating direction 16, the beater 13 may directly hit onto a back end of the boring tool 3 or indirectly transmit part of its impulse to the hammer drill 3 by way of an essentially stationary intermediate beater 17 (rivet header).

The driving components, e.g. the motor 4, the rammer 5, a transmission 18 are preferably arranged in a machine case 19 that is separate from the handle 7. The handle 7 is positioned next to the machine case 19 by way of undetachable cushioning suspensions 20. The distribution of the masses of the heaviest components motor 4, rammer 5 and battery pack, if applicable, determine the position of a center of gravity 21 of the hand machine tool 1. The center of gravity 21 of the motor 4 arranged outside the working axis 9 is offset to the working axis 9.

An absorber 30 is arranged in the machine case 19, preferably between the working axis 9 and the center of gravity 21 and alongside of the working axis 9, preferably between the center of gravity 21 and the handle 7. The absorber 30 has a body of mass 31, which is deflectable against a spring force from its idle position alongside of an absorber axis 32. In idle status, the spring forces acting on the body of mass 31 and if applicable the force of gravity cancel each other out. In the illustrated example, the absorber 30 is installed in the machine case 19 with a parallel orientation of the absorber axis 32 to the working axis 9.

Figure 2:
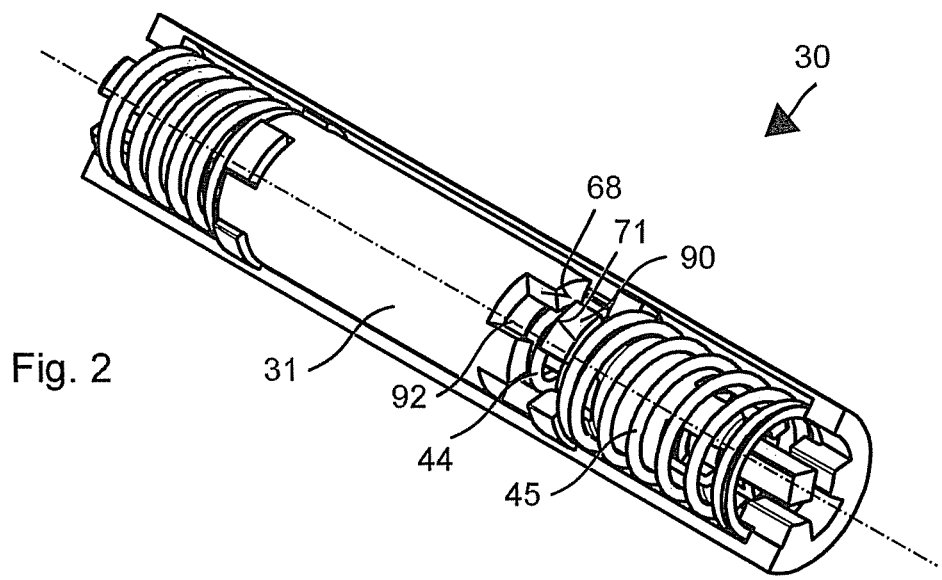
FIG. 2 shows an isometric view of a stimulated absorber, set to a low resonant frequency.
Figure 3:
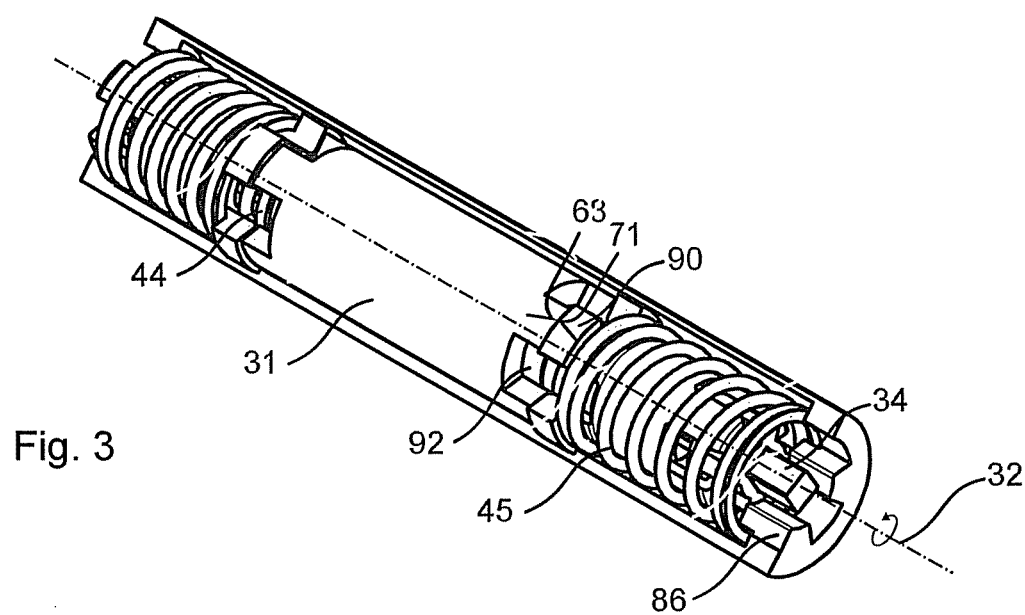
FIG. 3 shows an isometric view of the stimulated absorber set to a high resonant frequency.
Figure 8:
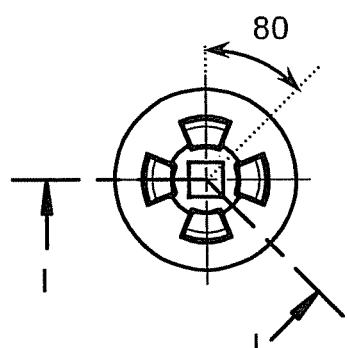
FIG. 8 shows a cross-section of the absorber of FIG. 2.
Figure 4:
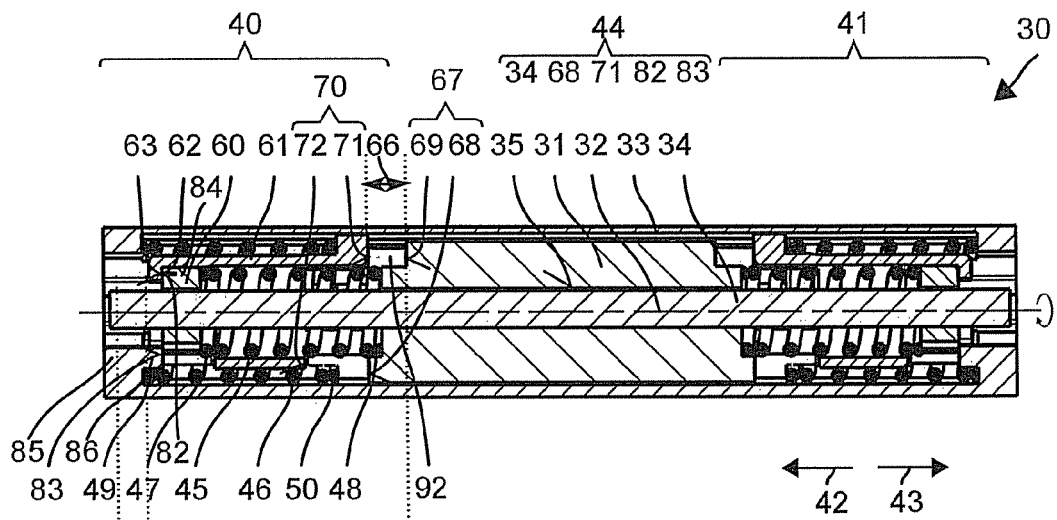
FIG. 4 shows a longitudinal section in plane I-I mentioned in FIG. 8 through the stimulated absorber set to a low resonant frequency in idle position.
Figure 5:
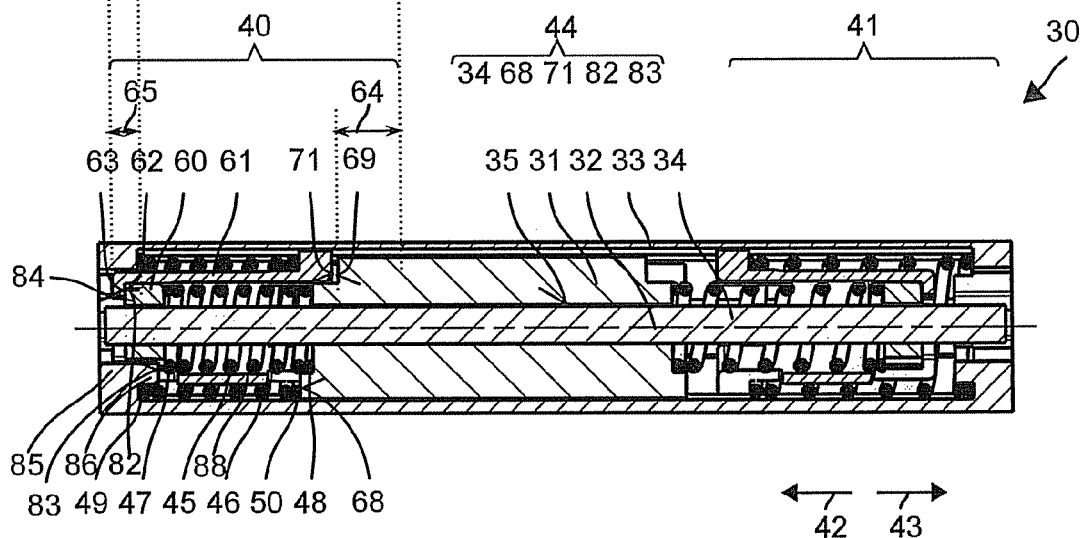
FIG. 5 shows a longitudinal section in plane I-I mentioned in FIG. 8 through the stimulated absorber set to a low resonant frequency.
Figure 6:
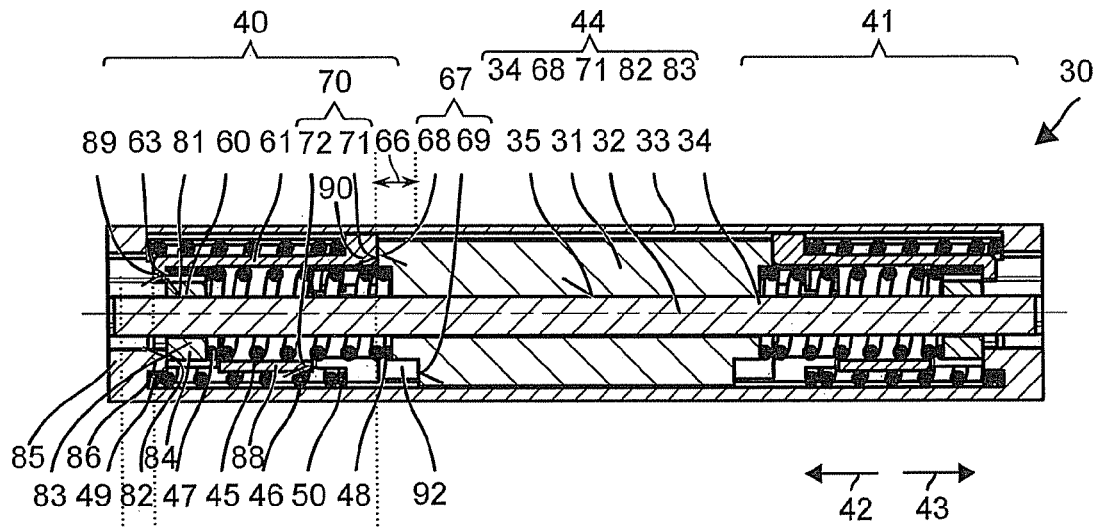
FIG. 6 shows a longitudinal section in plane I-I mentioned in FIG. 8 through the stimulated absorber set to a high resonant frequency.
Figure 7:
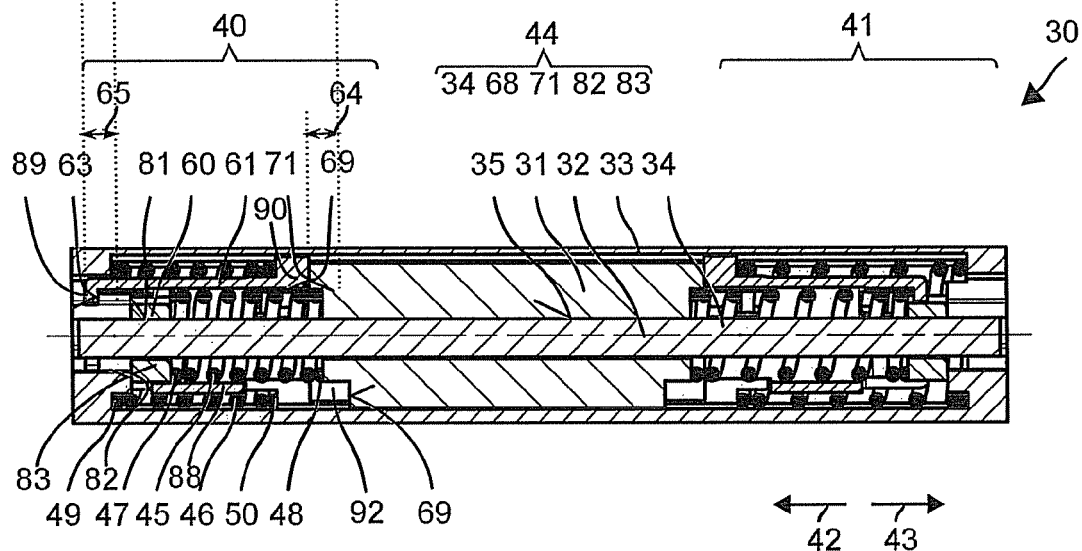
FIG. 7 shows a longitudinal section in plane I-I mentioned in FIG. 8 through the stimulated absorber set to a high resonant frequency in idle position.

FIG. 2 to 8 show an exemplary embodiment of the absorber 30. The absorber 30 may be switched mechanically between a plurality of settings, which differ in their stimulation behavior. One setting with a low resonant frequency is illustrated in FIG. 2 to 4 and another setting with a higher resonant frequency is illustrated in FIG. 5 to 7. FIGS. 2 and 5 show the absorber 30 in an isometric view with a partly exploded view of the case 33 and body of mass 31 deflected to the left. FIGS. 3 and 6 show the body of mass 31 in idle position; FIGS. 4 and 7 show it in a switching position deflected toward the left. FIG. 8 illustrates a buckled surface I-I in the cross-section perpendicular to the absorber axis 32, along which the longitudinal sections of FIGS. 3, 4, 6, and 7 extend. Hereinafter, axial is used synonymous for describing a direction alongside of or parallel to the absorber axis 32 and radial is used to describe a direction perpendicular to the absorber axis 32.

The absorber 30 has a shaft 34, on which the body of mass 31 is moveably supported in an axial direction, i.e. alongside of the absorber axis 32. The body of mass 31 has for example a cylindrical basic body. A longitudinal borehole 35 is provided alongside of the absorber axis 32, e.g. the axis of symmetry of the basic body, through which the shaft 34 is pushed. The cross-section of the longitudinal borehole 35 matches the cross-section of the shaft 34 in such a way that the body of mass led through the shaft 34 is axially moveable. The body of mass 31 is prevented from performing a radial movement, i.e. the body of mass 31 is perpendicular to the absorber axis 32. The cross-sections of the longitudinal borehole 35 and the shaft 34 are for example square-shaped. By turning the shaft 34 around the absorber axis 32, the body of mass 31 may be turned along. The cross-sections may also have other, non-rotation-symmetric shapes.

The spring force is exerted onto the body of mass 31 by way of a first spring device 40 and preferably a symmetrically arranged second spring device 41. The first spring device 40 exerts a restoring force onto the body of mass 31 with a deflection toward a first direction 42 alongside of the absorber axis 32 and the second spring device 41 exerts a restoring force with a deflection toward an opposite second direction 43. The two spring assemblies 40, 41 are preferably identical in construction and arranged symmetrical to the body of mass 31, and therefore only the first spring device 40 is described below representative for both spring assemblies 40, 41.

The spring device 40 has a switching mechanism 44, with which its spring constant may be adjusted to different values depending on the switching positions. A first switching position with a tiny spring constant is first described below with reference to the FIGS. 2 to 4.

The spring device 40 has a first spring 45 and a second spring 46. The two springs 45, 46 are for example spiral springs, used under axial pre-stress. To achieve a compact style, the first spring 45 may be inserted concentrically into the second spring 46. The first spring 45 has a first end 47, e.g. a first coil and a second end 48, e.g. a last coil. Similarly, the second spring 46 has a first end 49 and a second end 50. Each of the first ends 47, 49 of the two springs 45, 46 is facing away from the body of mass 31 relative to the associated second ends 48, 50 and points toward the first direction 42. The second ends 48, 50 point toward the opposite direction, in the example to the body of mass 31, i.e. toward the second direction 43.

The body of mass 31 is coupled with the second end 48 of the first spring 45. An axial force, i.e. a force acting alongside of the absorber axis 32 exerted from the body of mass 31 onto the first spring 45 is transmitted to the first spring 45 by way of its second end 48. The second end 48 of the first spring 45 may be connected detachably to the body of mass 31, e.g. by way of a purely frictional connection of the first spring 45 used under pre-stress, or undetachably, e.g. by way of friction fit, material fit such as welding or gluing. The second end 48 of the first spring 45 may be in direct contact with the body of mass 31.

The second spring 46 is coupled to the case 33 with its first end 49. An axial counter-force exerted from the case 33 is transmitted to the second spring 46 by way of the first end 49. The first end 49 of the second spring 46 may be connected detachably to the case 33, e.g. by way of a purely frictional connection of the second spring 46 used under pre-stress, or undetachably, e.g. by way of friction fit, material fit such as welding or gluing. The first end 49 of the second spring 46 may be in direct contact with the case 33.

In the first switching position, the first end 47 of the first spring 45 and the second end 50 of the second spring 46 are directly coupled by way of an axially moveable disc coupling 60 and an axially moveable strap 61.

The first spring 45 touches the disc coupling 60 with its first end 47. The first end 47 may be connected undetachably with the disc coupling 60 or may be pressed detachably onto the disc coupling 60 under pre-stress, as illustrated. The spring 45 may apply a force onto the disc coupling 60 toward the first direction 42. When the body of mass 31 is moved toward the first direction 42, i.e. toward the disc coupling 60, the first spring 45 is compressed and pushes onto the disc coupling 60 toward the first direction 42.

The second spring 46 touches the strap 61 with its second end 50. The second end 50 may be connected with the strap 61 detachably or undetachably. The second spring 46 may apply a force onto the strap 61 toward the second direction 43. If the strap 61 is moved toward the first direction 42 relative to the case 33, the second spring 46 is compressed and pushes onto the strap 61 toward the second direction 43.

A first stop face 62 of the disc coupling 60 is detachably resting on an opposite second stop face 63 of the strap 61. The first stop face 62 points toward the first direction 42, the second stop face 63 toward the second direction 43. When moved toward the first direction 42, the disc coupling 60 engages the strap 61 and moves toward the first direction 42 together with the strap 61. If the disc coupling 60 is moved toward the second direction 43, the disc coupling 60 separates and moves away from the strap 61. No force transmission under tensile load is intended between the first spring 45 and the second spring 46. Similarly, the strap 61 may move toward the first direction 42 without carrying the disc coupling 60 along. The fronts of the disc coupling 60 pointing toward the first direction 42 are not arranged opposite of any fronts of the strap 61 in the first direction 42.

If the body of mass 31 is deflected from the idle position toward the first direction 42, the force transmission pathway between the body of mass 31 and the case 33 is as follows. Starting from the body of mass 31, the force transmission pathway passes in the following order through the first spring 45, the disc coupling 60, the strap 61, the second spring 46 and then ends up in the case 33. An axial travel 64, by which the body of mass 31 is deflected relative to the case 33, is divided onto the first spring 45 and the second spring 46 (cp. FIGS. 3 and 4). The first spring 45 is compressed by a first part of the travel 64 and the second spring 46 by the remaining second part of the travel 64. The disc coupling 60 and the strap 61 move jointly with the body of mass 31, albeit by a reduced travel 65, because the first spring 45 is partly compressed. The reduced travel 65 is identical to the second part of the travel 64. The division of the axial travel 64 to the first part and the second part is inversely proportional to the ratio between the spring constant of the first spring 45 and the spring constant of the second spring 46.

Because the strap 61 only moves by the amount of the reduced travel 64, it results in a relative movement by the first part of the travel 64 between the body of mass 31 and the strap 61. Therefore, in idle position, the body of mass 31 is at a sufficient axial distance 66 from the strap 61, allowing an axial movement for a desired travel without touching the strap 61. A front 67 of the body of mass 31 pointing toward a first direction 42 may comprise first areas 68, which project further alongside of the first direction 42 than second areas 69. Similarly, a face 70 of the strap 61 facing toward the second direction 43 may comprise first areas 71, which project further toward the second direction 43 than second areas 72. The axial distance 66 between said uneven fronts 67, 70 is the shortest distance measured parallel to the absorber axis 32. For each point of the first front 67, the opposite point is determined by way of projection alongside of the absorber axis 32 onto the second front 70. From the pairs of points, the pair with the lowest distance defines the axial distance 66. The axial distance 66 is e.g. at least 5 mm.

Below is a description of a second switching position of the absorber 30 with a second, larger spring constant. The changes of the switched over spring device 40 are illustrated in the FIGS. 5 to 7.

In the second switching position of the spring device 40, the disc coupling 60 is inhibited from moving alongside of the absorber axis 32, at least toward the first direction 42. In the second switching position, the strap 61 is preferably still axially moveable and not inhibited. The force transmission pathway from the disc coupling 60 to the strap 61 is interrupted relative to the first switching position. The first spring 45 no longer applies a force onto the strap 61. The first spring 45 now transmits its forces directly onto the case 33 by way of the disc coupling 60. If the body of mass 31 is deflected toward the first direction 42, the strap 61 and as a result the second end 50 of the second spring 46 is not moved.

The first spring 45 is compressed by the entire amount of travel 64 of the body of mass 31. A larger force is exerted opposite the deflection of the body of mass 31 by the travel 64 than in the first switching position. The spring constant of the spring device 40 is higher as a result. Because the first spring 45 is uncoupled from the strap 61, no force is indirectly applied any more to the second spring 46 by the body of mass by way of the first spring 45.

Switching between the first switching position and the second switching position may be achieved by turning the shaft 34 by an angle 80 and by turning the disc coupling 60 along. The disc coupling 60 may be supported by the shaft 34. A slide bearing 81 of the disc coupling 60 enables axial sliding on the shaft 34, while inhibiting the relative turning of the shaft 34 and disc coupling 60 around the absorber axis 32. A cross-section of the shaft 34 may for example have a square or otherwise non-rotation-symmetric shape, the disc coupling has a complementary hollow borehole, which is pushed onto the shaft 34.

In the second switching position, the disc coupling 60 may be latched onto the case 33 and unlatched in the first switching position. The disc coupling 60 has for example an outline that is non-rotation-symmetric relative to the shaft 34 with an eccentric third stop surface 82 pointing toward the first direction 42. As well, the case 33 also has a non-rotation-symmetric outline with a fourth stop surface 83 pointing toward the second direction 43. In a rotational position of the disc coupling 60 for the second switching position, the fourth stop surface 83 is opposite the third stop surface 82 in the first direction 42, i.e. there is an overlap associated with a projection alongside of the absorber axis 32. Preferably, the third stop surface 82 and the fourth stop surface 83 already touch when the body of mass 31 is in idle position. In a different rotational position for the first switching position, the third stop surface 82 and the fourth stop surface 83 are arranged offset by an angle to the point that they do not overlap alongside of the absorber axis 32. The third stop surface 82 and the fourth stop surface 83 may be perpendicular to the absorber axis 32 or tilted relative to the absorber axis 32.

An exemplary outline of the disc coupling 60 has radially protruding claws 84 whose surfaces pointing toward the first direction 42 define the third stop surface 82. A sleeve 85 in the case 33 has claws 86 that extend inward, whose surfaces pointing toward the second direction 43 define the fourth stop surface 83. A cross-section of the hollow interior of the sleeve 85 is preferably designed complementary to a cross-section of the disc coupling 60. In one rotational position, the claws 84, 86 block a relative movement of the disc coupling 60 and sleeve 85, while the disc coupling 60 may slide inside the sleeve 85 in the other rotational position. The claws 84 of the disc coupling 60 may also form the first stop surface 62. In the illustrated embodiment, the claw 84 forms a stop surface 62 for the strap 61 and a stop surface 82 against the case 33, depending on the position.

An upgrade provides that the disc coupling 60 is friction-fitted to the case 33 in the one rotational position of the switching position, whereby a movement toward the second direction 43, namely the direction toward the body of mass 31 is also inhibited. For this purpose, for example two axially offset claws of the sleeve 85 may encompass a claw of the disc coupling 60 screwed in between the former in both directions 42, 43 in the second switching position.

In an alternative embodiment, the disc coupling is guided rotationally blocked and alongside of the absorber axis 32 of the case 33. The shaft 34 is rotatable relative to the disc coupling. A locking element, e.g. a peg on the shaft 34 catches into the disc coupling in one of the rotational positions and inhibits the movement alongside of the absorber axis 32.

An additional alternative embodiment provides that the disc coupling 60 is locked in one of the rotational positions using a radially inserted peg. No turning of the shaft 34 is required to set the first switching position and second switching position. Another embodiment provides that in the second switching position a latch connects the body of mass 31 with the strap 61 and the latch is unlatched from the strap 61 in the first switching position. No turning of the body of mass 31 is required.

Below is the description of a third switching position of the absorber 30 with a third, larger spring constant. The changes of the switched over spring device 40 are illustrated in FIGS. 5 to 7.

The body of mass 31 is in contact with the strap 61; the body of mass 31 preferably already touches the strap 61 in idle position. The strap 61 is inhibited to carry out a relative movement toward the second direction 43 relative to the body of mass 31. The disc coupling 60 may be moveable toward the second direction 43 relative to the body of mass 31. The force transmission pathway is changed relative to the first switching position. The body of mass 31 directly exerts a force onto the second spring 46, i.e. not indirectly by way of the first spring 45. The second spring 46 exerts its counterforces directly onto the body of mass 31 and is decoupled from the first spring 45.

When the body of mass 31 is deflected by the amount of travel 64, the second spring 46 is compressed by said entire amount of travel 64. A larger force is now opposed to the body of mass 31 than in the first switching position.

With an axial movement alongside of the absorber axis 32, the strap 61 may decouple from at least one of the two ends 48, 49 of the springs 45, 46 it is coupled to. The strap 61 may preferably be detachable from the disc coupling 60 and hence be decoupled from the first end 47 of the first spring 45. The other end 49 may undetachably be coupled with the strap 61, e.g. form- and/or material-fitted.

A switch from the first position to the third position may be achieved by turning the shaft 34. The body of mass 31 may be turned relative to the strap 61 by turning the shaft 34 by an angle 80. The front 70 of the strap 61 has first areas 71, which jut out in the direction toward the body of mass 31 relative to the second areas 72, i.e. toward the second direction 43. The front 67 of the body of mass 31 has first areas 68 and second areas 69, which are arranged opposite the first areas 68 and the second areas 69 alongside of the absorber axis 32. The first areas 68 jut out in the direction toward the strap 61 relative to the second areas 69. The recessed, second areas 69, 72 may for example be designed as recesses 92 in the cylindrical basic body of the body of mass 31 and the strap 61. In the first switching position, the first areas 71 of the strap 61 and the first areas 68 of the body of mass 31 are arranged at offset angles and opposite each of the recessed second areas 69, 72. The jutting out first areas 68, 71 are axially moveable relative to each other and plunge into the recessed areas 69, 72. In the third switching position, the jutting out first areas 68 of the strap 61 are resting on the jutting out first areas 68 of the body of mass 31, preferably already when the body of mass 31 is in idle position. A relative movement of the body of mass 31 and the strap 61 is inhibited in the third switching position.

The first areas and second areas may also be created using a front tilted toward the absorber axis 32.

The strap 61 may comprise for example a sleeve 88, coaxially arranged between the first spring 45 and the second spring 46. On a first end of the sleeve 88, a ring 89 radially protruding inward forms a stop for the disc coupling 60. Claws 90 radially protruding outward are provided on the second end, which form the protruding areas 71.

Below is the description of a fourth switching position of the absorber 30 with a fourth, largest spring constant. The changes of the switched over spring device 40 compared to the first switching position are illustrated in the FIGS. 5 to 7.

The functions of the second and third switching position are combined in the fourth switching position. The disc coupling 60 is inhibited from moving in an axial direction and the body of mass 31 directly acts on the second spring 46 in that the body of mass 31 is braced on the strap 61. The first spring 45 and the second spring 46 are both displaced by the axial travel 64 of the body of mass 31. As a result, the body of mass 31 is deflected against the sum of forces of the two springs 45, 46, which are coupled in parallel.

With the illustrated embodiment, the body of mass 31 and the disc coupling 60 may be turned by the shaft 34, while the strap 61 is preferably rotationally blocked relative to the case 33. The first spring 45, which is clamped in between the body of mass 31 and the disc coupling 60, i.e. inserted under pre-stress, is turned along with the latter. The second spring 45 is rotationally blocked, similar to the case 33 and the strap 61. When the desired switching position is set, the springs 44, 45 are not twisted around the absorber axis 32.

The springs 45, 46 may be designed with identical or different stiffness. Instead of the spiral springs used as exemplary springs, the springs may also be made of a flexible plastic, e.g. an elastomer.

Another embodiment is designed without the disc coupling and with the strap 61. The first spring 44 is detachably resting with the first end 47 directly on the second stop surface 63 of the strap 61. The first end 47 of the spring 44 and the strap 61 each form an element of the switchable force-transmitting coupler. An eccentric stop is provided on the shaft 34, which inhibits a movement of the strap 61 toward a first direction 42 in a rotating position (e.g. for the second switching position) and in a different rotating position releases the movement of the strap 61 toward the first direction 42 (e.g. for the first switching position). By turning the shaft 34, the body of mass 31 may at the same time be tuned for other switching positions or combined switching positions as described above.

The absorber 30 may be arranged in a fret saw or a saber saw. The orientation of the absorber axis 32 is preferably parallel to the direction of travel of a saw blade.

Figure 9:
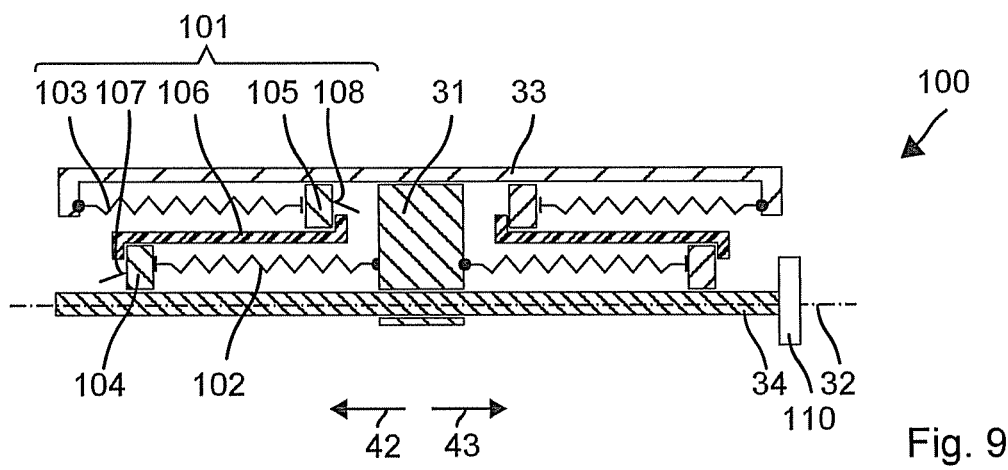
FIGS. 9 and 10 show an additional absorber in two settings, each illustrated in idle position.
Figure 10:
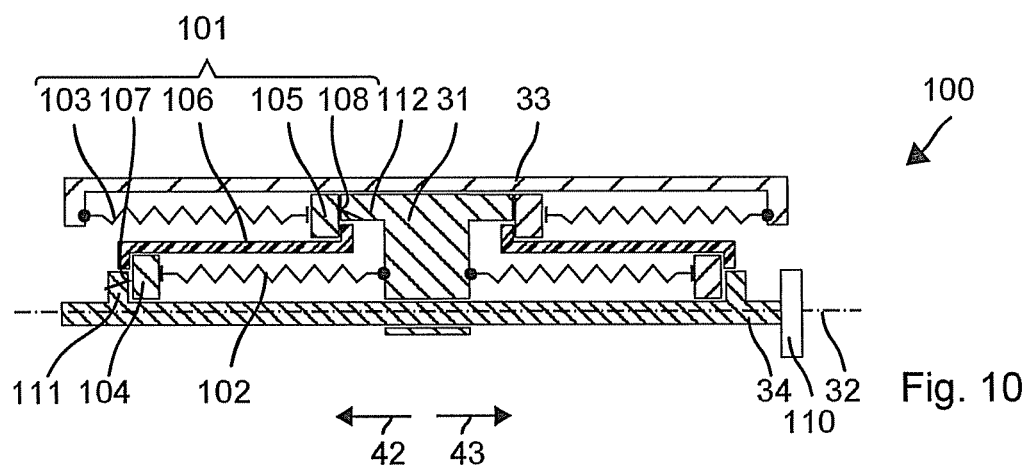

FIGS. 9 and 10 show a schematic view of an additional embodiment of an absorber 100 and its spring device 101. The spring device 101 has a first spring 102 and a second spring 103, which are both pressurized. The body of mass 31 applies force onto the first spring 102 toward the first direction 42. The second spring 103 is braced on the case 33 toward the first direction 42. Three coupling elements 104, 105, 106, which are axially moveably supported are arranged between the first spring 102 and the second spring 103. The first coupling element 104 rests on the first spring 102 and has a first stop surface 107 pointing toward the first direction 42. The second coupling element 105 rests on the second spring 103 and has a second stop surface 108 pointing toward a second direction 43, which is opposed to the first direction 42. The two stop surfaces 107, 108 may be in a projection perpendicular to the absorber axis 32 with no overlap. The third coupling element 106 rests on the first stop surface 107 and on the second stop surface 108. With a movement toward the first direction 42, the first coupling element 104 carries along the second coupling element 105 by way of the third coupling element 106. The coupling element 106 is preferably a rigid body. The two springs 102, 103 are connected in series (FIG. 9).

A switching mechanism 110 may connect the springs 102, 103 in parallel. The switching mechanism 110 has a stop 111, which is moveable perpendicular to the absorber axis 32 and inhibits the first coupling element 104 from moving toward the first direction 42 in a position for coupling in parallel. In one position, an additional moveable stop 112 inhibits the second coupling element 104 from a relative movement toward the second direction 43. The switching mechanism 110 may for example be activated by turning the shaft 34.

Figure 11:
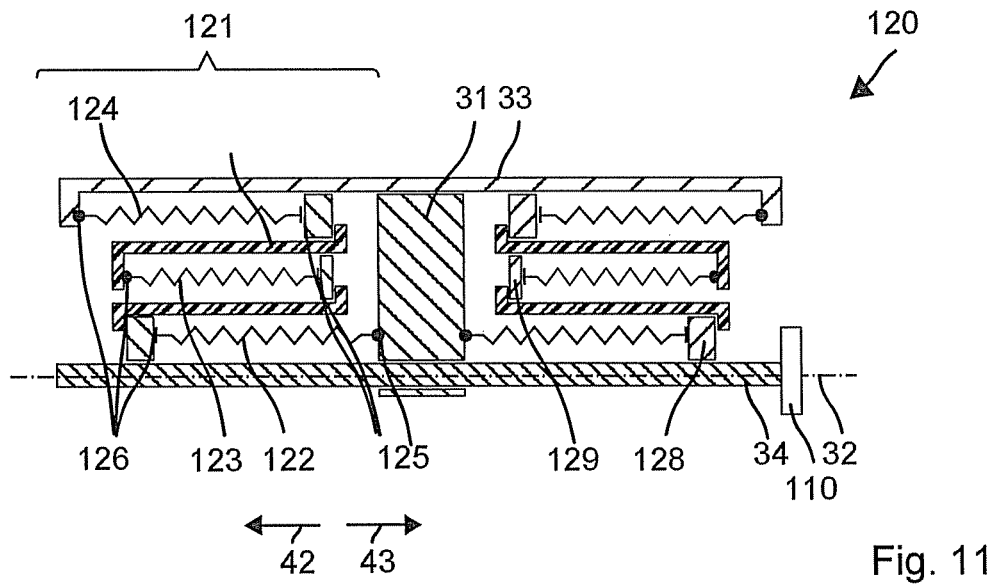
FIGS. 11 and 12 shows an additional absorber in two settings, each illustrated in idle position.
Figure 12:
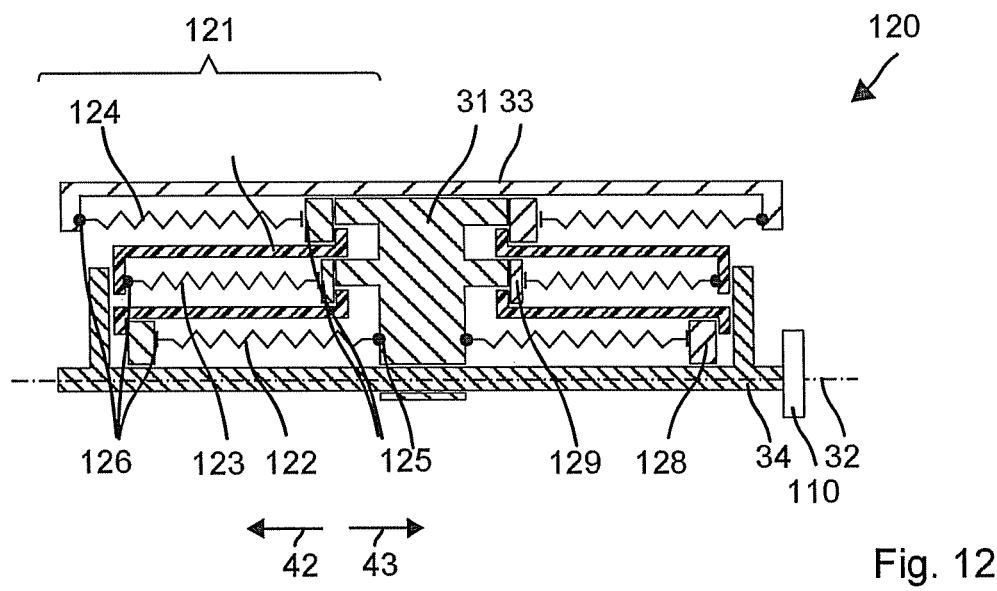

FIG. 11 and FIG. 12 show an additional embodiment of an absorber 120 with a spring device 121, which has a larger number of pressurized springs 122. Instead of two springs, a plurality of springs 122, 123, 124 are cascaded. The springs 122, 123, 124 each have a first end 125 pointing toward the first direction 42 and a second end 126 pointing toward the second direction 43. The springs 122, 123, 124 are arranged in ascending order, wherein the first spring 122 is directly coupled to the body of mass 31 in every switching position and the last spring 124 is coupled directly with the case 33 in every switching position. A first coupling element 128 and a second coupling element 129 each are connected between adjacent springs 122, 123; 123, 124, etc. The design of the coupling elements 128, 129 may for example be derived from the disc coupling 60 and the strap 61. The first coupling element 128 rests on the second coupling element 129 toward the first direction 42. The first coupling element 128 may only move toward the first direction 42 jointly with the second coupling element 129; analogously, the second coupling element 129 may only move jointly with the first coupling element 128.

In one switching position, the first coupling elements 128 are freely moveable toward the first direction 42 relative to the case 33 and the second coupling elements 129 are freely moveable toward the second direction 43 relative to the body of mass 31. The body of mass 31 is braced on the case 33 by way of the springs 122, 123, 124, which are coupled in series (FIG. 11).

In an additional switching position, the first coupling elements 128 are inhibited from a relative movement toward the first direction 42 relative to the case 33 and the second coupling elements 129 from moving toward the second direction 43 relative to the body of mass 31. The body of mass 31 is braced on the case 33 by way of the springs 122, 123, 124, 125, 126, which are coupled in parallel (FIG. 12).

Figure 13:
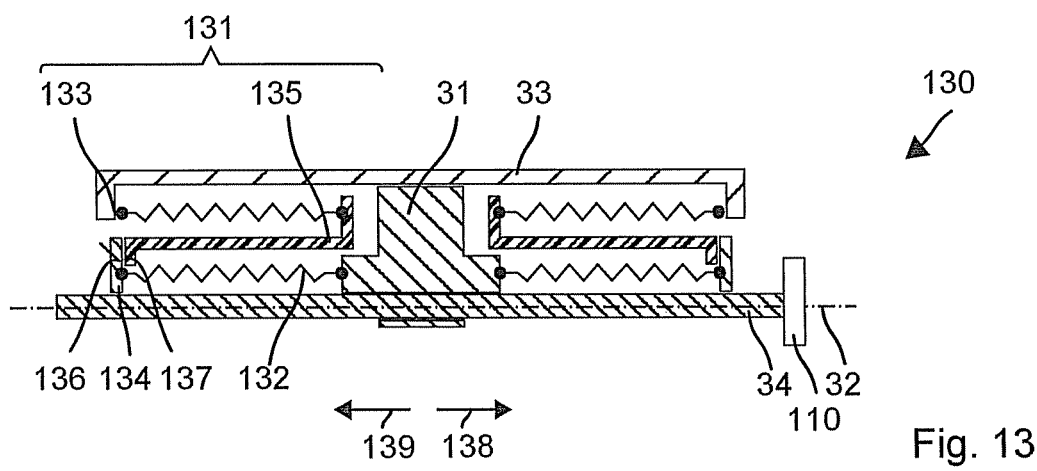
FIGS. 13 and 14 show an additional absorber in two settings, each illustrated in idle position.
Figure 14:
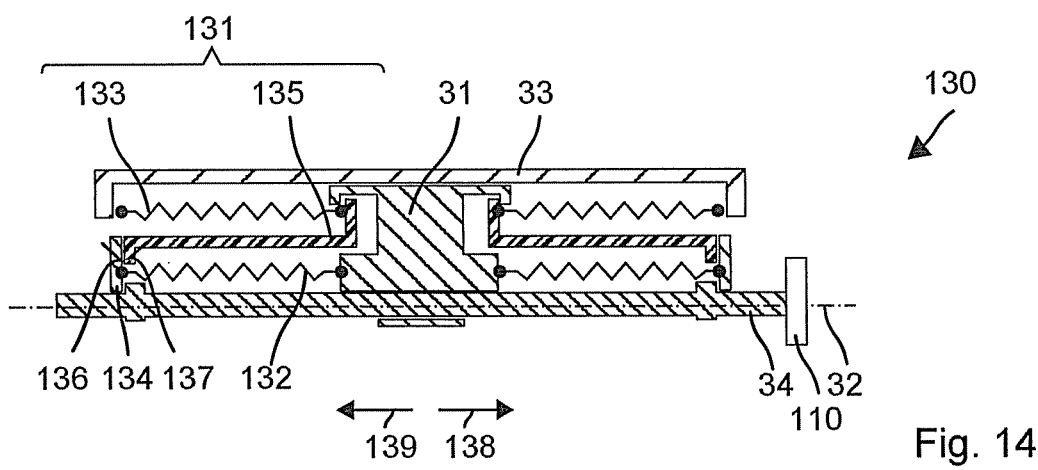

FIG. 13 and FIG. 14 illustrate an additional embodiment of an absorber 130 having a spring device 131 with tensile loaded springs 132, 133. The modification compared to the embodiments described above lies in the relative arrangement of the first coupling elements 134 and the second coupling elements 135. The effective direction of the first spring 132 aimed at the first coupling element 134 runs in the direction toward the body of mass 31. The first coupling element 134 has a first stop surface 136, which rests on a second stop surface 137 of the second coupling element 135. The first stop surface 136 points into a first direction 138 toward the body of mass 31, because the latter corresponds to the effective direction of the first spring 132 aimed at the first coupling element 135. The second stop surface 137 is aimed at the case 33 toward a second direction 139 according to effective direction of the second spring 133. The springs 132, 133 are connected in series.

A different switching position with the springs 132, 133 connected in parallel is illustrated in FIG. 14. A movement of the first coupling element 134 is inhibited toward the first direction 138, and a movement of the second coupling element 135 is inhibited toward the second direction 139. Other switching positions according to the second and the third switching position of the previous embodiments may be realized by way of selective inhibition of the coupling elements 134, 135.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. An absorber for a hand machine tool with a linear drive, wherein the absorber comprises:
   a case;
   a body of mass moveable alongside of an axis of the absorber relative to the case;
   a first coupling element moveable alongside of the axis of the absorber, with force applied to said first coupling element using a first spring coupled with the body of mass toward a first direction;
   a second coupling element moveable alongside of the axis of the absorber, with force applied to said second coupling element using a second spring coupled with the case toward a second direction, which is opposed to the first direction, wherein the first coupling element is coupled with the second coupling element in connection with movement toward the first direction and the first coupling element is uncoupled from the second coupling element in connection with movement toward the second direction; and
   a switching device configured to select between preventing and enabling movement of the first coupling element toward the first direction relative to the case depending on a switching position of the switching device.

2. The absorber of claim 1, wherein:
   one switching position of the switching device results in the body of mass touching the second coupling element on a surface pointing toward the second direction; and a different switching position of the switching device results in the body of mass having a distance from the surface.

3. The absorber of claim 1, wherein:
one switching position of the switching device results in the case touching the first coupling element on a surface pointing toward the first direction; and
a different switching position of the switching device results in the case being at a distance from the surface.

4. The absorber of claim 1, wherein the body of mass is arranged moveably on a shaft alongside of the axis, the body of mass and the shaft are pivotable around the axis relative to the case, by using the switching device.

5. A machine hand tool including:
an absorber, wherein the absorber comprises:
a case;
a body of mass moveable alongside of an axis of the absorber relative to the case;
a first coupling element moveable alongside of the axis of the absorber, with force applied to said coupling element, which is coupled with the body of mass using a first spring toward a first direction;
a second coupling element moveable alongside of the axis of the absorber, with force applied to said second coupling element using a second spring coupled with the case toward a second direction, which is opposed to the first direction, wherein the first coupling element is coupled with the second coupling element in connection with a movement toward the first direction and the first coupling element is uncoupled from the second coupling element in connection with a movement toward the second direction; and
a switching device configured to select between preventing and enabling movement of the first coupling element toward the first direction relative to the case depending on a switching position of the switching device;
wherein the first coupling element has a first stop surface pointing toward the first direction and the second coupling element has a second stop surface pointing toward the second direction.

6. The machine hand tool of claim 5 wherein the first stop surface rests on the second stop surface and is detachable from the second stop surface toward the second direction.

7. The machine hand tool of claim 5 wherein a third coupling element moveable alongside of the absorber axis rests on the first stop surface and the second stop surface and is detachable from at least the first stop surface toward the second direction or from the second stop surface toward the first direction.

8. The machine hand tool of claim 5, further comprising:
a control element coupled to the switching device; and
a pneumatic rammer having a beating period that is settable by way of the control element.

9. The machine hand tool of the claim 8, wherein the control element via the switching device adjusts an effective spring force applied to the body of mass to tune the mass body movement to the beating period of the pneumatic rammer.

10. A machine hand tool, comprising:
an exciter moveable alongside a working axis of the machine hand tool;
a motor coupled to the exciter and configured to force the exciter to perform periodic linear movement alongside the working axis; and
an absorber comprising a case, a mass body, a shaft, and a spring device that couples the mass body to the case;
wherein the shaft runs alongside an longitudinal axis of the absorber;
wherein the mass body is movable along the shaft and the longitudinal axis of the absorber;
wherein the spring device comprises a plurality of springs and a switching device having a first switching position and a second switching position;
wherein the spring device, in response to the switching device being in the first switching position, configures the plurality of springs to apply a first spring constant to the mass body; and
wherein the spring device, in response to the switching device being in the second switching position, configures the plurality of springs to apply a second spring constant to the mass body.

11. The machine hand tool of claim 10, wherein the longitudinal axis of the absorber is aligned with the working axis of machine hand tool such that movement of mass body counters the periodic linear movement of the exciter.

12. The machine hand tool of claim 10, further comprising:
a control element coupled to the switching device; and
a pneumatic rammer comprising the exciter coupled to a beater via a pneumatic spring;
wherein the exciter moves the beater via the pneumatic spring at a beating period that is settable by way of the control element.

13. The machine hand tool of the claim 12, wherein the control element via the switching device selects between the first spring constant and the second spring constant to adjust movement of the mass body to the beating period of the pneumatic rammer.

\* \* \* \* \*